United States Patent [19]
Tungseth et al.

[11] 3,762,446
[45] Oct. 2, 1973

[54] METHOD AND DEVICE FOR INTERNALLY LOCATING AND SEALING PIPELINE LEAKS

[75] Inventors: Barry F. Tungseth; Donald E. Olson; Louis J. Skriba, all of St. Paul, Minn.

[73] Assignee: Minnesota Mining and Manufacturing Company, St. Paul, Minn.

[22] Filed: Dec. 8, 1970

[21] Appl. No.: 96,089

[52] U.S. Cl. ............................. 138/97, 73/40.5 R
[51] Int. Cl. ............................................. F16l 55/18
[58] Field of Search ................ 138/97, 98, 90, 18, 138/137, 148; 166/277, 207; 165/46, 156, 166; 73/49.8, 40.5 R

[56] References Cited
UNITED STATES PATENTS

| | | | |
|---|---|---|---|
| 2,959,196 | 11/1960 | Truesdell et al. | 138/148 |
| 3,173,196 | 3/1965 | Grimm | 29/157.3 |
| 3,540,223 | 11/1970 | Ebbe | 138/148 X |
| 3,103,235 | 9/1963 | Stringham III | 138/97 |
| 2,341,319 | 2/1944 | Graham et al. | 165/156 |
| 2,572,320 | 10/1951 | Cox et al. | 165/46 UX |
| 2,878,837 | 3/1959 | Burtt | 165/154 X |
| 3,194,310 | 7/1965 | Loomis | 166/277 X |
| 3,168,909 | 2/1965 | Zurbrigen et al. | 138/97 |
| 3,269,421 | 8/1966 | Telford et al. | 138/97 |

FOREIGN PATENTS OR APPLICATIONS

| | | | |
|---|---|---|---|
| 212,715 | 3/1924 | Great Britain | 138/97 |
| 1,207,090 | 9/1970 | Great Britain | 73/40.5 R |

*Primary Examiner*—William E. Wayner
*Attorney*—Kinney, Alexander, Sell, Steldt & Delahunt

[57] ABSTRACT

A method and a device for internally locating leaks in a pipeline and sealing the leak without interrupting the normal use of the pipe. The device has a tubular rigid body which is open at both ends and is covered on the outside by an inflatable sleeve which can be pressurized to seal off a liquid-tight cavity between the pipe wall and the sleeve surface. The pipe is tested for leaks by pressurizing the cavity with a test liquid and thereafter observing the pressure drop to determine if a leak is present. If a leak is discovered, a settable liquid sealant is forced into the cavity filling the leak.

3 Claims, 5 Drawing Figures

PATENTED OCT 2 1973　　　3,762,446
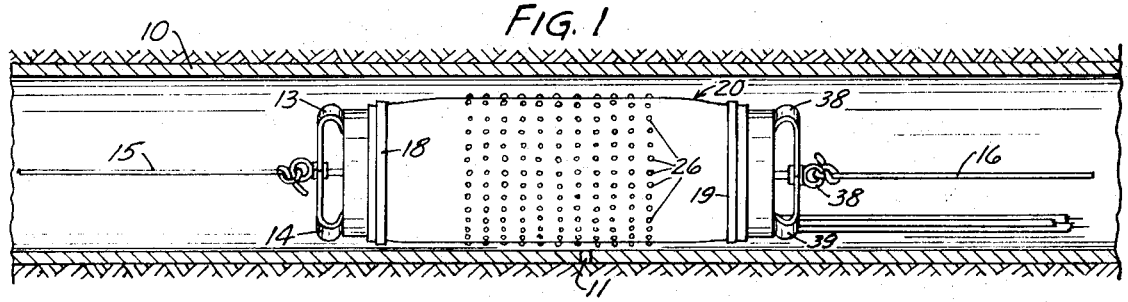
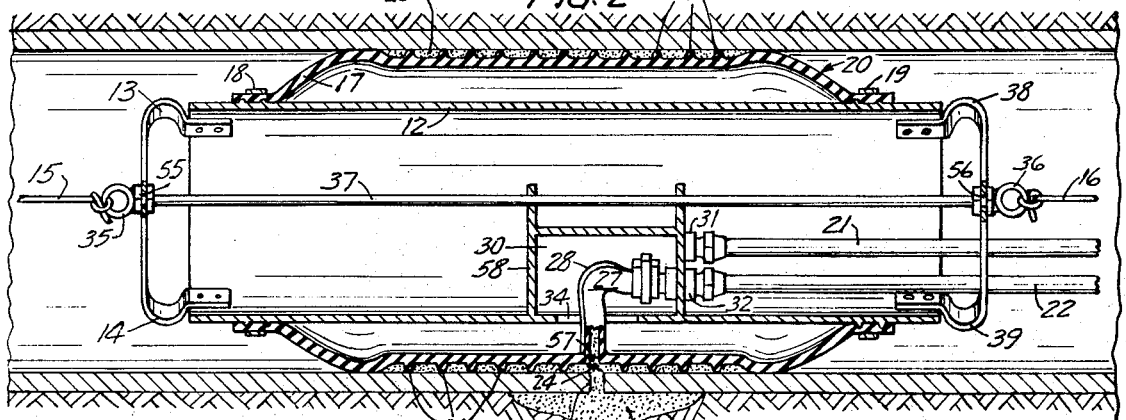
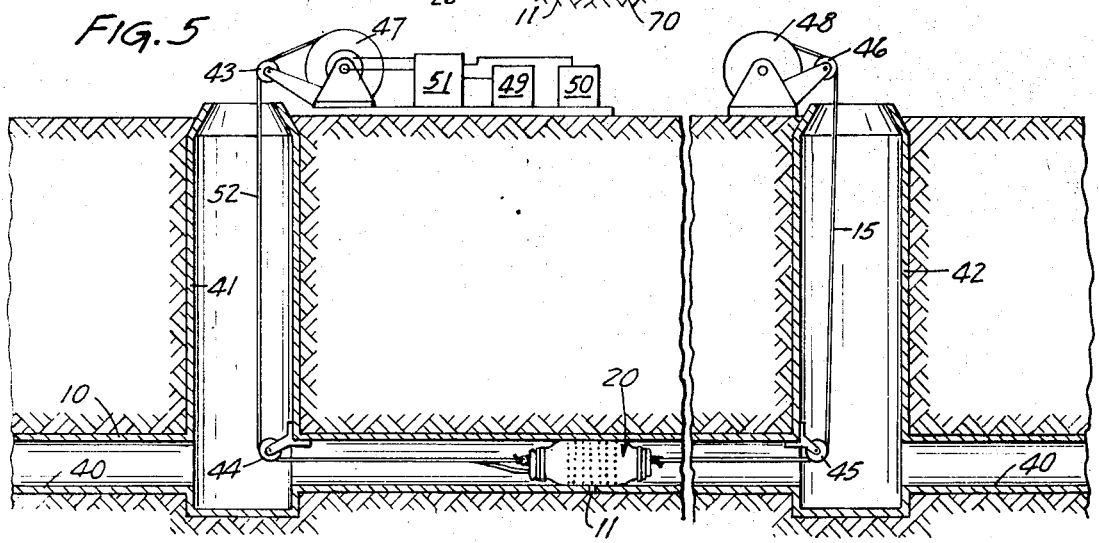
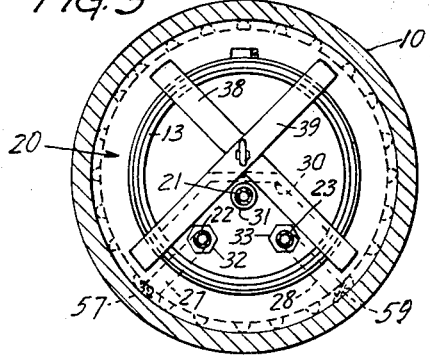
INVENTORS
BARRY F. TUNGSETH
DONALD E. OLSON
LOUIS J. SKRIBA
BY Kinney, Alexander,
Sell, Steldt & DeLaHunt
ATTORNEYS

METHOD AND DEVICE FOR INTERNALLY LOCATING AND SEALING PIPELINE LEAKS

This invention relates to a device and method for internally locating and sealing pipeline leaks.

The device and the method of this invention are primarily for use in detecting and sealing sewer pipeline leaks. The invention is, however, also useful in detecting and sealing leaks in other types of pipes and conduits such as gas lines, oil lines, and the like.

Sewer pipelines will develop leaks due to shifting and settling of the ground in which they are buried, causing joints to open or the pipe to crack. Leaks are also caused by the deterioration of sealant applied at sewer pipe joints caused by age or other reasons, or possibly by the lack of joint sealant as may be the case in older installations where such substances were often not used. Sewer pipe leaks pose an increasingly serious pollution problem. Exfiltration of sewage from leaks produces harmful levels of nitrates and bacteria in the soil which can cause contamination of drinking water sources. Infiltration of ground water into the sewer pipe through the leak may deplete natural ground waters, as well as cause overloading of sewer facilities.

Heretofore the locating of sewer pipe leaks has been both time consuming and very expensive. One method of testing for leaks involved blocking all the openings to the particular line being tested and applying air pressure to the section being tested. Falling pressure would then indicate a leak. This test procedure is not desired because it requires the service be interrupted during inspection, it fails to pin-point the leak although it may indicate there is a leak present in that section, and it is not applicable to use with concrete sewer pipe because of the porous nature of concrete.

The use of a portable television camera which passes through the sewer line has found wide acceptance for use in inspecting sewer lines. For this inspection, however, the sewer line must be clean and dry. Therefore, not only must the service be interrupted for television inspection, but the line must be cleaned before the inspection. Additionally, only visible infiltration of water and gross cracking will be seen by television whereas small cracks and exfiltration leaks are not readily visible with such apparatus. Further, television equipment is expensive as well as being sensitive, therefore, subject to failure in this type of use, requiring costly repairs and frequent periods of downtime.

The use of sewer sealing mechanisms which isolate a small portion of the sewer line to form a cavity into which sealant under pressure can be injected, is known. For examples of these mechanisms see U.S. Pat. Nos. 3,103,235 and 3,168,908. These mechanisms, however, are only useful for sealing, and must be used in conjunction with a leak detecting device such as a television camera. The leak sealing device is therefore not situated at the same location in the pipe as the leak detecting device but is spaced therefrom by a fixed distance. Thus when a leak is located, movement of the sealing device to the leak is required. Such movement is inconvenient and a potential source of mistake.

There is provided by the present invention a device useful for inspecting a portion of pipe, locating a leak, and sealing it without requiring movement of the device from that portion. Additionally, after sealing the leak, the repaired portion can be reinspected if desired, to determine the efficacy of the repair.

The device comprises an open tubular member having an elastic covering which may be inflated. With the covering deflated the device passes easily through the pipe. Inflating the covering against the inner surface of the pipe provides a hermetic seal at both ends of the device, leaving an open narrow channel therebetween into which a test fluid and if necessary a sealant may be forced under pressure. The channel extends around the device providing a small volume into which correspondingly small quantity of sealant can be introduced thereby minimizing sealant waste.

Basically the device comprises a hollow rigid tube over which an inflatable sleeve has been positioned and sealed at the ends forming an inflatable space between them. Because the body of the device is a hollow tube the device will not disrupt the flow of liquid in the pipe being serviced. The exterior surface of the sleeve is smooth near the ends and has protruberances around the center portion. Upon inflation the smooth sleeve portions will circumferentially contact adjacent pipe walls to make a liquid-tight seal and the center protuberance-covered portion will keep that part of the sleeve from sealing against the pipe, thus providing a cavity. A fluid supply line is provided to inflate the sleeve to make the aforementioned seals. Additional supply lines are provided to deliver test liquid and sealant to the cavity.

The method involves positioning the device in the portion of pipe to be tested, sealing off the pipe portion forming a cavity by inflation of the sleeve, injecting a test liquid under pressure to pressurize the cavity, measuring the pressure drop of the test liquid to determine if a leak is present, and injecting sealant under pressure into the cavity if a leak is found. The test liquid pressure will gradually fall over a period of time if a leak is present due to escape of test liquid through the leak.

The invention is illustrated in the accompanying drawing wherein:

FIG. 1 is an illustration showing the leak detecting-sealing device of the present invention in perspective in position in a subterranean pipeline shown in section;

FIG. 2 is an enlarged view similar to that shown in FIG. 1 showing the device in section in one stage of operation;

FIG. 3 is an end view in perspective of the device shown in FIG. 2 showing some internal parts in dotted lines;

FIG. 4 is a detail view showing in section an integral aspect of the device shown in FIG. 2; and FIG. 5 is a schematic representation showing the device and associated equipment in use in a sewer pipeline.

FIG. 1 shows a portion of a subterranean pipeline 10 having a crack 11 which produces a leak that can be located and sealed with the aid of the device 20 of the present invention.

As seen in FIGS. 2, 3, and 4 the device 20 comprises an open-ended rigid tube 12, means for moving the device endwise such as provided by U-shaped crossed members 13 and 14, 38 and 39, each member spanning the opening of the tube crossing approximately perpendicular to its adjacent member and being attached at the edges of the tube, and rod 37 passing through openings 55 and 56 provided in the overlap area of the crossed members and having rings 35 and 36 at either end for accommodating tow lines 15 and 16 respectively, an inflatable sleeve 17 positioned over tube 12 and formed of a resilient material such as rubber, and fastening means such as ring clamps 18 and 19 to hold the sleeve against the tube in a fluid-tight relationship to form an inflatable space therebetween. A housing 58 providing chamber 30, having pipe fitting 31, 32, 33 entering therein for receiving supply lines, is attached to the inner wall of the tube over an opening 34 in an intermediate portion of the tube providing a continuous space between chamber 30 and the inflatable space between the sleeve and the tube.

Sleeve 17 hereinafter described in detail has protuberances 26 formed in its exterior surface as an annular band around the center portion of the sleeve. The remaining exterior surface of the sleeve, i.e., near the ends, is free of such protuberances and has a smooth surface. A flexible line 21 passing through the open end of the tube, connected to fitting 31, furnishes a conduit for providing fluid under pressure, e.g., compressed air or water under pressure, for inflating sleeve 17. Lines 22 and 23, also flexible, are directed through the open end of the tube and connected to fittings 32 and 33, respectively. Gooseneck hose portions 27 and 28, connected at the opposite ends of fittings 32 and 33, respectively, pass through the chamber and opening 34 in the wall of the tube, and terminate through openings 57 and 59, respectively, at the exterior surface of the sleeve in the area covered by protuberances 26. Hose portions 27 and 28, are attached to the sleeve in liquid-tight relationship preferably as an integral part thereof such as can be provided when the sleeve is first formed. Supply lines 22 and 23, through hose portions 27 and 28, provide a continuous conduit to the exterior surface of sleeve 17 terminating at openings 57 and 59 thereon.

As shown by FIG. 1 when device 20 is being drawn into position in the pipe sleeve 17 lies smoothly against the exterior of tube 12 and the device can easily pass through the pipe even if it has moderate discontinuities. When the device is in use, however, such as shown by FIG. 2, sleeve 17 is expanded by fluid under pressure to cause the exterior wall of the sleeve to circumferentially conform to the adjacent interior surface of the pipe. As shown in FIG. 2 the exterior surface of sleeve 17 is smooth near the ends thereby allowing that portion of the sleeve to come into liquid-tight relationship with the pipe wall surface upon inflation. The intermediate exterior surface of sleeve 17, covered by small protuberances 26, e.g., hemispheres or portions thereof from about ⅛ to ¼ inch in height and from about ¼ to about ½ inch in diameter, spaced to prevent the sleeve wall from extending between protuberances to the pipewall, creates a continuous cavity 29 circumferentially about the center portion of the sleeve between the exterior wall of the sleeve and the adjacent pipe wall surface. Hose portions 27 and 28, provided as continuation of supply lines 22 and 23, respectively, one for supplying test liquid and the other liquid sealant therethrough to cavity 29, will retract into the tube through opening 34 upon deflation of sleeve 17 to permit the sleeve to conform to the surface of tube 12.

As can be seen in FIGS. 2, 3, 4, supply lines 21 and 23, passing through hose portions 27 and 28 respectively, terminate at the surface of sleeve 17 in the area covered by protuberances 26, with one-way valves 24 and 25. Each valve is of the type that opens only when liquid is forced through the line with which the valve is associated, such as provided by a simple flexible flap attached at one side of the terminal opening of the line. Preferably, the side of the flap adjacent the hole has formed thereon a hemispherical protuberance the size of the opening providing an effective sealing means. Thus as liquid is forced through line 22, valve 24 is opened and valve 25 is forced shut due to the liquid pressure in cavity 29, thereby preventing liquid from leaving the cavity through line 23. Likewise on injection of a liquid into the cavity through line 23, valve 25 is opened and valve 24 is closed.

FIG. 5 is a schematic representation showing the device 20 in a typical use situation, i.e., in a sewer line. Generally, a typical continuous subterranean sewer line 40 has associated therewith manholes, e.g. 41 and 42, for servicing the sewer. The leak detecting device 20 of the present invention is lowered on line bundle 52 into the sewer through a manhole 41 and drawn through a section of the sewer line to be serviced by tow rope 15 which is first floated through the sewer line to the next manhole 42.

Certain other mechanical fixtures may be provided, if desired, for ease of operation, e.g., guide rolls 43–46 and power or manually operated reels 47 and 48 upon which tow lines and supply lines may be stored. Apparatus 49 and 50 for supplying liquid under pressure such as provided by a conventional liquid pump associated with a liquid storage tank, are provided for supplying test liquid and liquid sealant, respectively, to the device 20. The apparatus for supplying the test liquid may also supply fluid under pressure to inflate sleeve 17, or a separate apparatus therefore may be provided. Supply lines carry these fluids to an automatic or a manual control system 51 having valve means for selectively providing the various fluids to the device as required and a pressure measuring means for measuring the pressure in the test liquid supply line.

The exterior surface of sleeve 17 is held away from the wall of the pipe when the device is being drawn into position by the crossed members at either ends. These members are shaped to extend beyond the wall of the collapsed sleeve to act as skids upon which the device rides.

A sewer line is examined by drawing device 20 through the sewer pipe to the portion to be tested. On reaching the desired location the sleeve inflating fluid source is activated to supply fluid under pressure to inflate the sleeve and provide the hereinbefore described liquid-tight cavity. Pressure is maintained in the sleeve until inspection and sealing, if required, are accomplished. Test liquid is forced into the cavity at a pressure slightly less than that used to inflate the sleeve.

The test liquid pressure is monitored by measuring the pressure in test liquid supply line or in the liquid-tight cavity. If the pressure holds constant there is no leak in the portion of the line being tested. The failure to establish pressure will reveal a service connection in the test area. A decrease of pressure over a period of time indicates that there is a leak in the test area. If the latter condition exists, the test liquid supply is deactivated and the sealant supply is activated to force liquid settable sealant into the cavity and through the leak to form irregular sealant mass 70 outside the pipe as shown in FIG. 2. Sufficient sealant is forced therein to seal the leak. After permitting sufficient time to elapse for the sealant to set, the sleeve is deflated and the device is moved to a new location. If no leak was observed or if no pressure build up occurred the sleeve is deflated and likewise moved.

As can be seen by the sequence of steps taken in the inspecting and sealing of pipelines the system can easily be operated automatically with a suitable automatic fluid control system which will sense the various pressure conditions and activate the appropriate pumps and valves such as provided by systems which are well known in the field of fluidics.

In a specific embodiment of the device for use in an 8 inch (I.D.) pipe, the rigid shell 12 is a 24 inch long aluminum tube having a 5 inch outside diameter and a ⅛ inch thick wall. The tube 12 is covered by a 21 inch long, ⅛ inch thick butyl rubber sleeve 17 having ¼ inch high, ½ inch diameter hemispherical protuberances 26 disposed in rows aligned both annularly and longitudinally on the sleeve. The protuberances are in a band about 11 inches in width at the center of the sleeve, the outer margins of the sleeve being smooth. The sleeve is attached at either end of the rigid tube by airplane hose clamps tightened to provide a fluid-tight seal. ⅜ inch (I.D.) flexible tubing provides the required supply lines.

In the abovementioned embodiment, the sleeve is inflated with water at 25 pounds per square inch, causing the sleeve to expand to the pipe wall creating the aforementioned liquid-tight cavity. Water is introduced into the cavity at 20 pounds per square inch to test for leaks. The pressure is monitored for about 30 seconds or more to determine if a leak is present.

Suitable sealants useful with the device of the invention are low viscosity materials which gel or set up in a few minutes time to a solid or semi-solid composition which will block the flow of water through a leak. Exemplary sealants useful with the device are isocyanate-terminated prepolymers such as disclosed in U.S. Pat. appl. Ser. No. 48,157, filed June 22, 1970, incorporated herein by reference. The aforementioned prepolymers require moisture to cause polymerization therefore they will remain fluid in the supply line and will be caused to polymerize by the presence of moisture in the area of the leak. Moisture will be provided in the area of the leak if water is used as a test liquid.

We claim:

1. A pipeline inspection and sealing device comprising a rigid open-ended cylindrical shell, an elastically stretchable sleeve covering the exterior of said shell and hermetically sealed thereto at both ends, the outer end margins of said sleeve being smooth-surfaced and the remainder of the outer surface of said sleeve being covered with protuberances, the outer diameter of said sleeve-covered shell (when the sleeve is deflated) being capable of easily passing through the pipeline being tested even if said line has moderate discontinuities, said sleeve being capable of expanding to cause its smooth margins and the tops of said protuberances to contact the interior of said pipe, first conduit means providing access from within said shell to the space between said shell and said sleeve for carrying inflating fluid to and from said space, second and third conduit means providing access from within said shell to the protuberant outer surface of said sleeve for carrying test liquid and repair liquid respectively under pressure to said surface, said second and third conduit means each being provided with a one-way valve.

2. The device of claim 1 further comprising skids attached to the ends of said shell and shaped to prevent contact of the uninflated sleeve with the pipe.

3. A pipeline inspection and sealing system comprising the device described in claim 1 in combination with means for moving said shell end-wise through said pipe, means for supplying and maintaining fluid under pressure through said second conduit, means for detecting said liquid pressure, and means for supplying said repair liquid under pressure through said third conduit.

* * * * *